April 21, 1925.
L. ROUANET
1,534,328
REMOVABLE WHEEL
Filed July 25, 1923
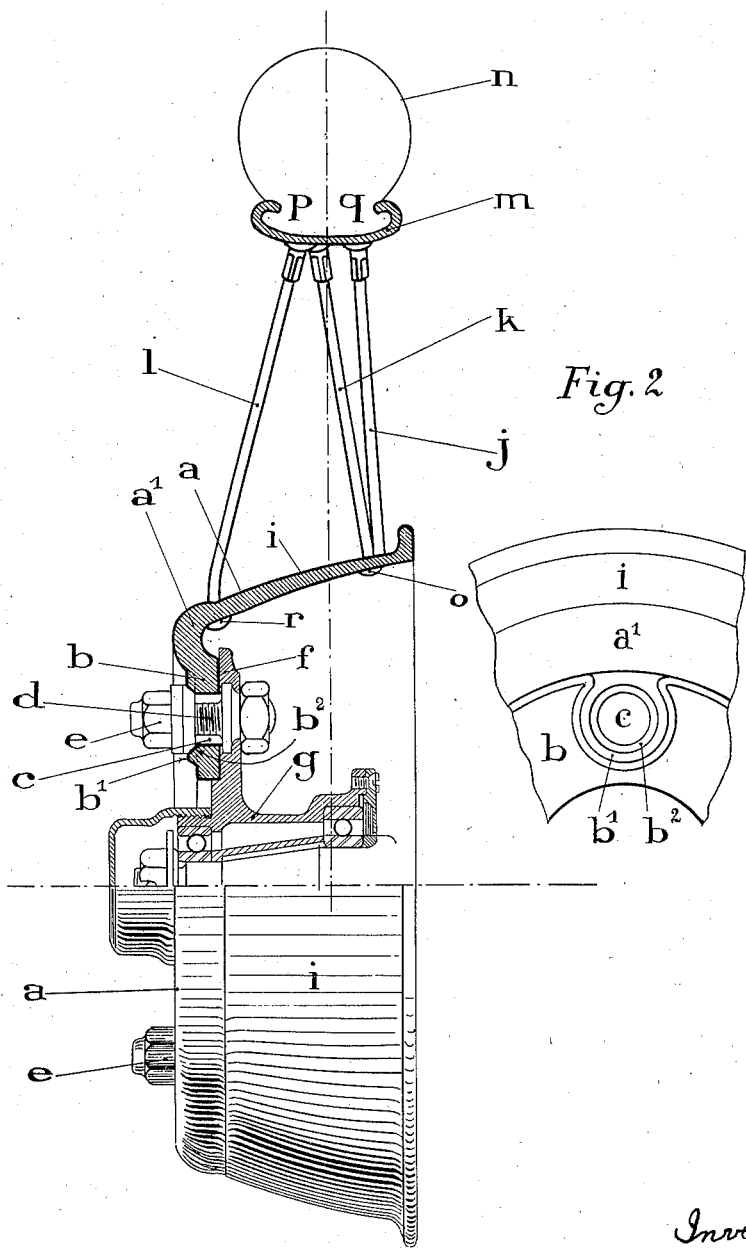
Inventor
Louis Rouanet
By Wm Wallace White
Attorney Patented Apr. 21, 1925.

1,534,328

UNITED STATES PATENT OFFICE.

LOUIS ROUANET, OF IVRY-PORT, FRANCE, ASSIGNOR TO THE COMPAGNIE D'APPLICATIONS MECANIQUES, OF PARIS, FRANCE.

REMOVABLE WHEEL.

Application filed July 25, 1923. Serial No. 653,650.

*To all whom it may concern:*

Be it known that I, LOUIS ROUANET, citizen of the French Republic, residing at Ivry-Port, Seine, in the French Republic, have invented new and useful Improvements in Removable Wheels, of which the following is a specification.

The present invention relates to a removable wheel for motor vehicles or the like, of the type comprising a wheel hub whereupon series of metallic wire spokes, connecting the hub to the tire carrying rim, are attached, said hub comprising an annular part or flange by means of which it can be readily mounted, by means of bolts and nuts or any other known attaching means, on a flat collar provided on the central hub permanently mounted on the vehicle axle.

The accompanying drawing shows by way of example an embodiment of the wheel according to the invention.

In Fig. 1, the upper half of the figure is a cross section of the wheel mounted on the axle hub, and the lower half shows the wheel hub in side view.

Fig. 2 is a partial elevation of the central part of the wheel proper.

The wheel hub $a$ is made of light cast metal, preferably of the "Alpax" alloy which is now on sale on the market. Said hub is made with a flat annular flange $b$ provided with a series of apertures $c$ disposed on a circle and through which the bolts $d$ receiving the nuts $e$ may extend. These bolts and nuts constitute the means for securing the wheel to the collar part $f$ of the permanent hub $g$ carried by the front or rear axle of a car. The part $a^1$ of the hub, adjacent to the flange $b$ constitutes a very thick rib having a semi-circular shape, which provides for a great resistance, while however keeping a certain elasticity. Said rib is thicker than the part $i$ of the hub and than the flange $b$, with a view to increase the resistance while at the same time reducing to a minimum the weight of the whole hub. Moreover, said rib affords a good protection for the bearing surfaces $b^2$ of the hub flange against accidental shocks when the wheel is dismounted. The bearing surfaces $b^2$ are formed into bosses $b^1$ provided on the outer face of the flange $b$. The length of the part $i$ of the hub is greater than the width of the rim and has the shape of a cup with substantially convex wall, its thickness gradually decreasing towards the inner side of the wheel. To the part $i$ are attached three series of spokes $j$, $k$, $l$ which connect the hub $a$ to the rim $m$ carrying the tire $n$.

The series of spokes $j$ and $k$, which serve particularly to transmit the driving and braking stresses, are disposed according to a triangle, as shown in the drawing, the triangle having its apex at $o$ on the hub, and its base $p$—$q$ on the rim. The series of spokes $l$, which withstands particularly the lateral thrusts, is much inclined from the exterior to the interior; the spokes of this series are attached at $r$, on the body of the hub $a$, adjacent the flange $b$. The distance $o$—$r$ being relatively great, the wheel has a great resistance.

Having now described my invention, what I claim as new and desire to secure by Letters Patent is:

In a wheel with metal wire spokes for vehicles, a hub of light cast metal the length whereof is greater than the width of the rim of the wheel, said hub comprising a substantially convex part whose thickness decreases towards the inner side of the wheel, a flat annular flange and an annular rib having a semi-circular cross-section and connecting said convex part to said flat annular flange, the thickness of said rib being greater than that of the two latter parts, apertures provided in said flat annular flange and adapted for the passage of securing bolts, said flange carrying bosses around said apertures and conical bearing surfaces for the securing bolts being provided in said bosses.

In testimony whereof I have signed my name to this specification.

LOUIS ROUANET.